(12) United States Patent
Kinba et al.

(10) Patent No.: US 6,686,577 B2
(45) Date of Patent: Feb. 3, 2004

(54) DEVICE DETECTING FOCUS OF A TAKING LENS WITHOUT DECREASE IN FOCUS DETECTION ACCURACY WHEN THE AUTO FOCUS AREA IS DISPOSED AT AN INCLINATION RELATIVE TO THE PHOTOGRAPHIC FIELD

(75) Inventors: Akio Kinba, Suita (JP); Hiroshi Ueda, Habikino (JP); Iwao Ishida, Higashiosaka (JP); Masataka Hamada, Osakasayama (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/801,898

(22) Filed: Mar. 9, 2001

(65) Prior Publication Data

US 2001/0023917 A1 Sep. 27, 2001

(30) Foreign Application Priority Data

Mar. 15, 2000 (JP) ........................ 2000-072401

(51) Int. Cl.⁷ .............................................. G02B 27/40
(52) U.S. Cl. ................. 250/201.2; 250/201.4; 396/111; 396/114
(58) Field of Search .................. 250/201.2, 201.7, 250/201.8, 201.4, 216; 348/335, 345, 349, 350, 357; 396/111, 114

(56) References Cited

U.S. PATENT DOCUMENTS

| | | | |
|---|---|---|---|
| 4,808,808 A | | 2/1989 | Karasaki et al. |
| 5,258,804 A | * | 11/1993 | Suda ........................... 396/121 |
| 5,612,762 A | * | 3/1997 | Ohsawa ....................... 396/114 |
| 5,805,941 A | * | 9/1998 | Iyama ......................... 396/274 |
| 5,864,721 A | * | 1/1999 | Suda et al. .................. 396/114 |
| 5,923,909 A | * | 7/1999 | Hamada ...................... 396/114 |
| 6,188,845 B1 | * | 2/2001 | Sensui ........................ 396/114 |
| 6,297,909 B1 | * | 10/2001 | Sensui ........................ 359/618 |
| 6,369,854 B2 | * | 4/2002 | Ishida et al. ................ 348/345 |

* cited by examiner

Primary Examiner—Kevin Pyo
Assistant Examiner—Seung C. Sohn
(74) Attorney, Agent, or Firm—McDermott, Will & Emery

(57) ABSTRACT

An optical element disposed behind a main mirror and inclined relative to the optical axis is arranged at a position to correct aberration in the luminous flux generated by transmission through the main mirror.

10 Claims, 13 Drawing Sheets

DEVICE DETECTING FOCUS OF A TAKING LENS WITHOUT DECREASE IN FOCUS DETECTION ACCURACY WHEN THE AUTO FOCUS AREA IS DISPOSED AT AN INCLINATION RELATIVE TO THE PHOTOGRAPHIC FIELD

This application is based on Patent Application No. 2000-72401 filed in Japan, the content of which is hereby incorporated by reference.

BACKGROUND OF THE INVENTION

1. Field of the Invention

The present invention relates to a focus detecting device.

2. Description of the Related Art

In conventional single-lens reflex cameras, an area on the photographic screen for accomplishing the autofocus (AF) operation (hereinafter referred to as the "auto focus area") is disposed vertically or horizontally relative to the rectangular shaped photographic screen, but in recent years an oblique AF area disposition has come to be necessary for wide range and the like.

When the AF area is oblique, however, focus detection accuracy is decreased compared to the vertical/horizontal dispositions.

That is, when luminous flux passes through a main mirror disposed at an inclination relative to the optical axis, the luminous flux is refracted within the main mirror, such that the image forming position is shifted and aberration is generated. Conventionally, optical elements are positioned behind the main mirror without regard for this aberration.

The arrangement of the focus detection area at an inclination refers the case wherein a direction connecting two photoreceptor sensors is neither parallel nor perpendicular relative to a plane including the normal line of the main mirror and the optical axis.

In general, such optical elements disposed behind the main mirror include a sub-mirror for refracting the optical path, aperture mask for capturing only the luminous flux of the AF area, separator lens for forming an image with the luminous flux of the AF area, and photoreceptor sensor (e.g., a charge-coupled device (CCD) sensor) for receiving the luminous flux forming an image on the AF area.

The present inventors ascertained that decreased focus detection accuracy is caused by the increased influence of aberration particularly when the AF area is disposed at an inclination.

Accordingly, the technical object of the present invention of eliminating these problems is attained by providing a focus detecting device which does not decrease focus detection accuracy even when the AF area is disposed at an inclination.

SUMMARY OF THE INVENTION

The technical objects of the present invention are attained by the focus detecting device of the present invention comprising, in a focus detecting device for detecting the focus of a taking lens using the luminous flux of a focus detection area disposed at an inclination relative to the photographic field, a first optical element for transmitting luminous flux transmitted through a taking lens and disposed at an inclination relative to the optical axis behind the taking lens; and a second optical element arranged at a position for correcting aberration generated by luminous flux transmitted through the first optical element and disposed behind the first optical element.

The present invention arranges the second optical element so as to correct aberration of luminous flux generated by the first optical element. In this way aberration influence is nil or slight, and the focus detection accuracy is not decreased even when the AF area is disposed at an inclination.

The technical objects of the present invention are attained by another focus detecting device of the present invention comprising, in a focus detecting device for detecting the focus of a taking lens using the luminous flux of a focus detection area disposed at an inclination relative to the photographic field, a first optical element for transmitting luminous flux transmitted through a taking lens and disposed at an inclination relative to the optical axis behind the taking lens; and a second optical element disposed at an inclination relative to the optical axis and disposed behind the first optical element wherein the second optical element is provided with a first surface through which enters the luminous flux transmitted through the first optical element, and a second surface for reflecting the luminous flux transmitted through the first surface.

The technical objects of the present invention are attained by another focus detecting device of the present invention comprising, in a focus detecting device for detecting the focus of a taking lens using the luminous flux of a focus detection area disposed at an inclination relative to the photographic field, a first optical element for transmitting luminous flux transmitted through a taking lens and disposed at an inclination relative to the optical axis behind the taking lens; and a second optical element for transmitting light transmitted through the first optical element and disposed at an inclination in the opposite direction of the first optical element.

BRIEF DESCRIPTION OF THE DRAWINGS

In the following description, like parts are designated by like reference numbers throughout the several drawings.

DETAILED DESCRIPTION OF THE PREFERRED EMBODIMENTS

The focus detecting device of the preferred embodiments of the present invention are described hereinafter with reference to the accompanying drawings.

Figure 1:
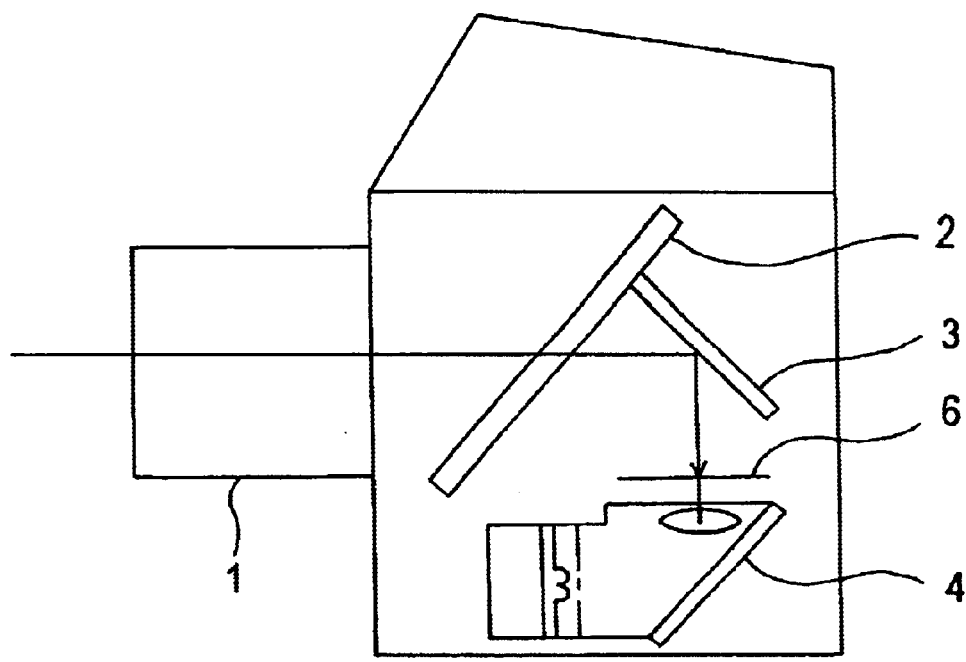
FIG. 1 shows the structure of a camera applying the present invention.
Figure 2:
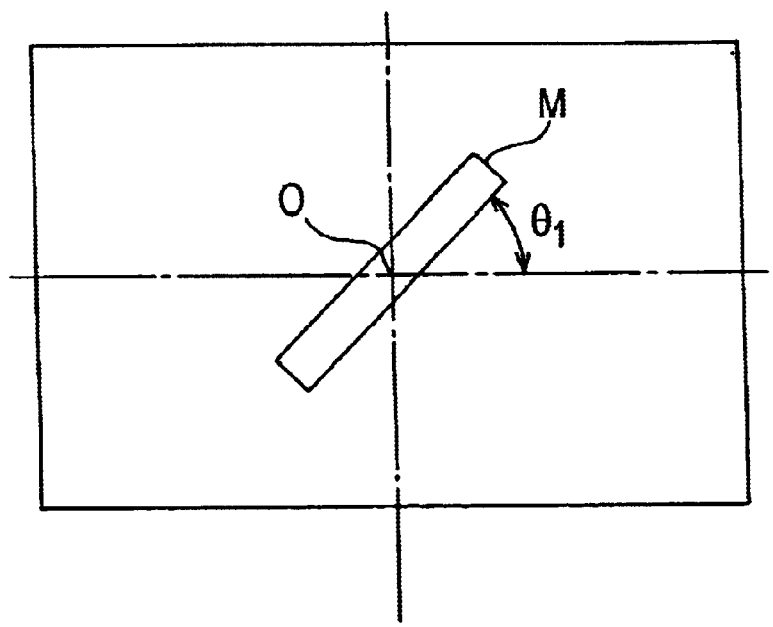
FIG. 2 is a layout diagram of the AF area.

Each embodiment described below pertains to a single-lens reflex camera wherein luminous flux is transmitted through a taking lens 1, main mirror 2, sub-mirror 3 and directed to an AF module 4 as shown in FIG. 1, wherein an AF area M is arranged at an inclination of angle $\theta1$ ($0<\theta1<90°$) relative to the photographic screen, as shown in FIG. 2. Reference number 6 refers to the focal plane, and reference symbol O refers to the optical axis center.

Figure 3:
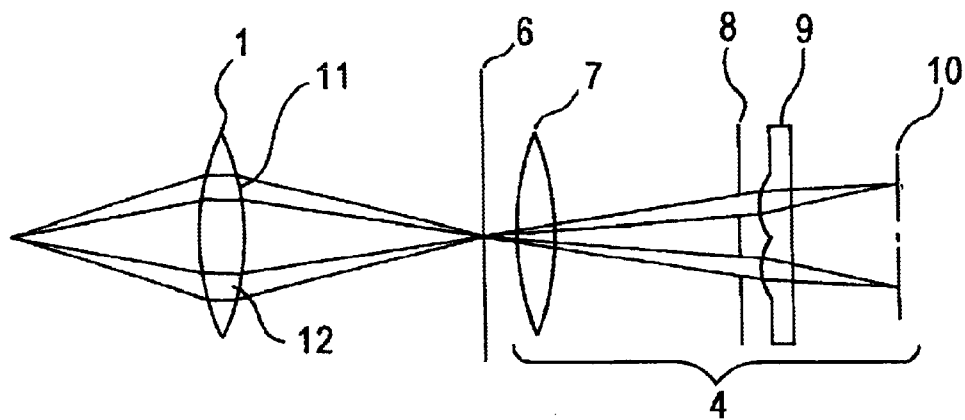
FIG. 3 shows the structure of the focus detecting device.
Figure 4:
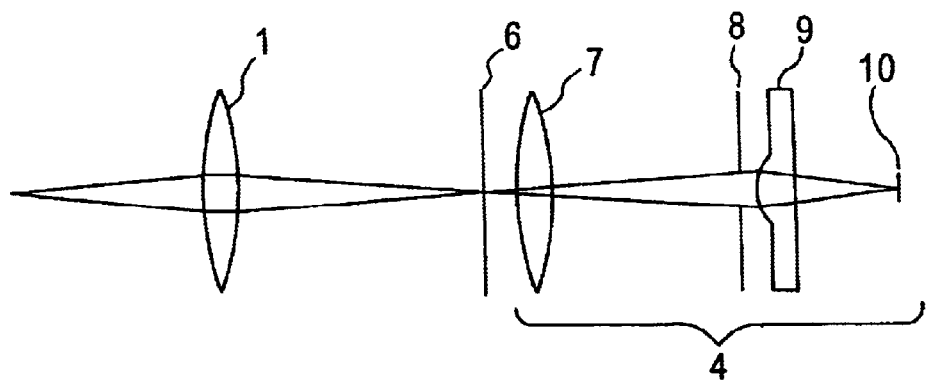
FIG. 4 is a cross sectional view of FIG. 3.

The principle of focus detection is that luminous flux transmitted through different pupils 11 and 12 of a taking lens 1 also passes through a condenser lens 7, aperture mask 8, and separator lens 9 and is directed to a sensor 10, and focus detection is accomplished by calculating the phase difference of the two images. FIG. 4 is a cross sectional view of FIG. 3.

Figure 5:
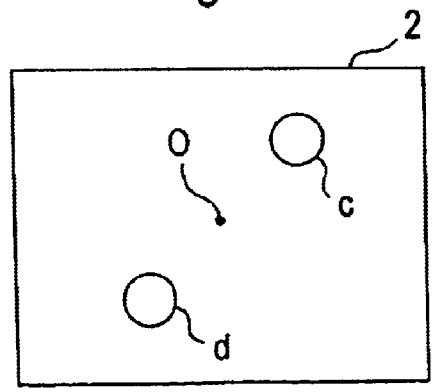
FIG. 5 is a layout diagram of the AF area on a main mirror.
Figure 6:
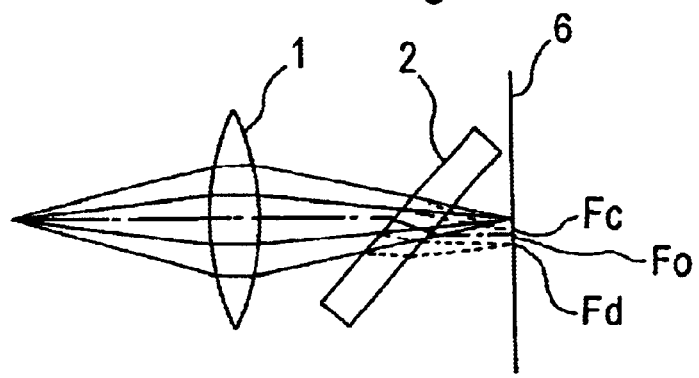
FIG. 6 illustrates the image forming position.
Figure 7:
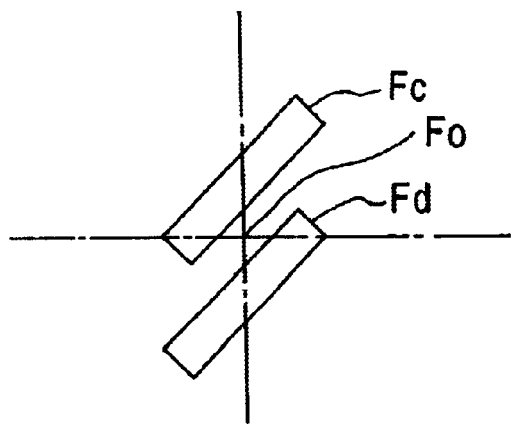
FIG. 7 is a layout diagram of the image forming position on the focal plane.

When using an AF area arrangement as shown in FIG. 2, the luminous flux of the AF area on the main mirror 2 arrives at positions c and d which are symmetrical relative to the optical axis O as shown in FIG. 5. At this time aberration is generated in the luminous flux due to the difference in optical paths caused by refraction by the main mirror 2, as shown in FIG. 6, such that the image forming positions are shifted from Fo on the optical axis to positions Fc and Fd. That is, the image forming positions Fc and Fd are shifted vertically on the focal plane 6, as shown in FIG. 7.

Figure 8:
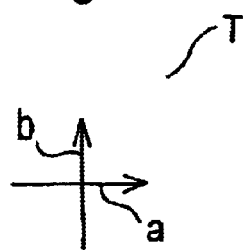
FIG. 8 illustrates an object.
Figure 9:
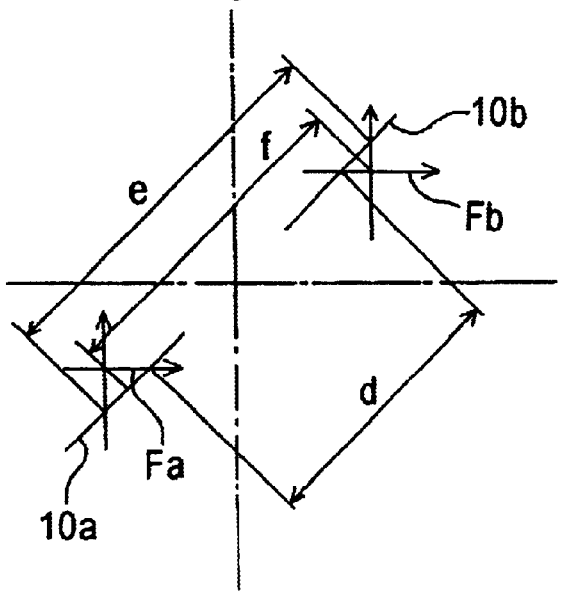
FIG. 9 illustrates the image forming position of an object image.
Figure 10:
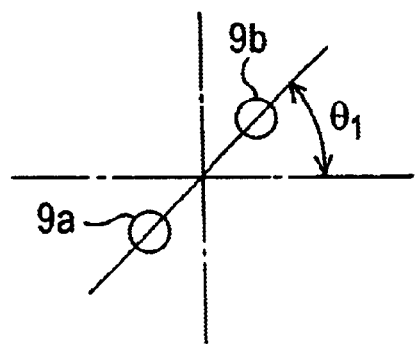
FIG. 10 is a layout diagram of a separator lens.
Figure 11:
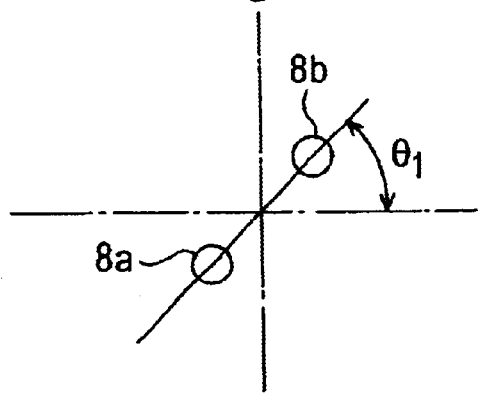
FIG. 11 is a layout diagram of an aperture mask.
Figure 12:
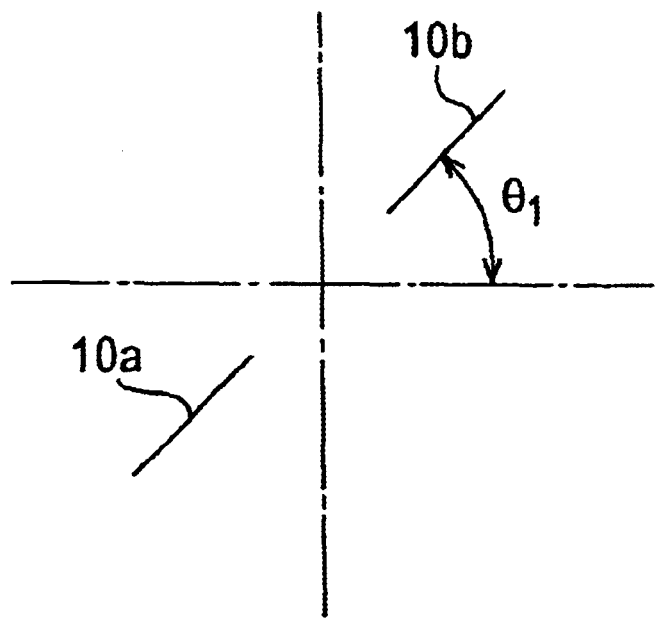
FIG. 12 is a layout diagram of the photoreceptor sensor.
Figure 13:
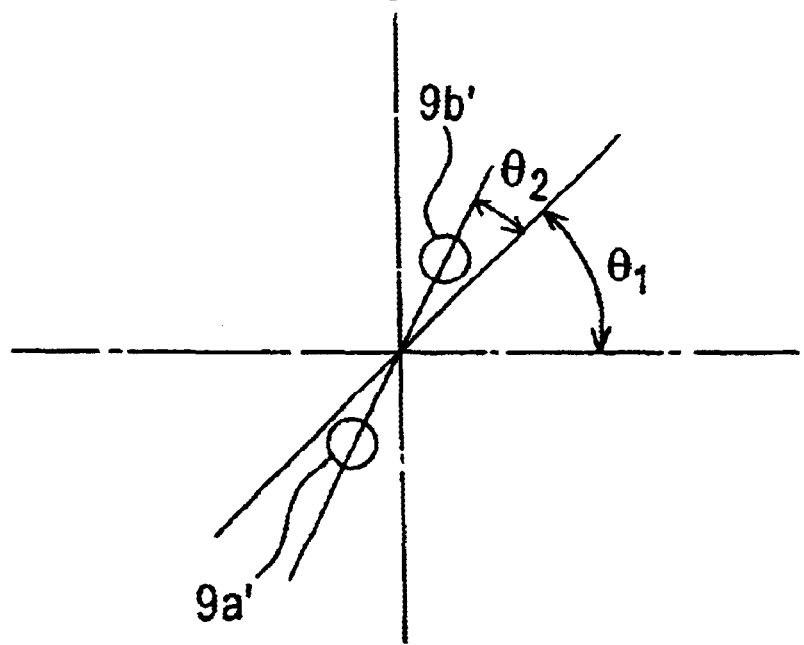
FIG. 13 shows the structure of the separator lens in the first embodiment of the present invention.

When an object T having an angle, as shown in FIG. 8, is measured relative to the line direction of the AF area M inclined at an angle $\theta1$, the lens elements 9a and 9b of the separator lens 9, apertures 8a and 8b of the aperture mask 8, and photoreceptors 10a and 10b of the photoreceptor sensor (CCD line sensor) 10 are simply inclined at an angle $\theta1$, as shown in FIGS. 10, 11, 12, and when thus arranged, the object image is formed at positions Fa and Fb shifted from the photoreceptor surfaces 10a and 10b of the photoreceptor sensor, as shown in FIG. 9. That is, the photoreceptor surfaces 10a and 10b do not see the same position of the object. For this reason error is generated in the focus detection result.

For example, the measured values of the distance d at the intersection point of the photoreceptor surfaces 10a and 10b of the photoreceptor sensor and the image forming position of the horizontal section a of the object T, and the distance e of the intersection point of the photoreceptor surfaces 10a and 10b and the image forming position of the perpendicular section b of the object T, are unequal (e≠d). Therefore, error is generated in the focus detection result by using either d or e as the measurement value.

An object of the embodiments described below is to correct this error.

A first embodiment is described hereinafter.

Figure 14:
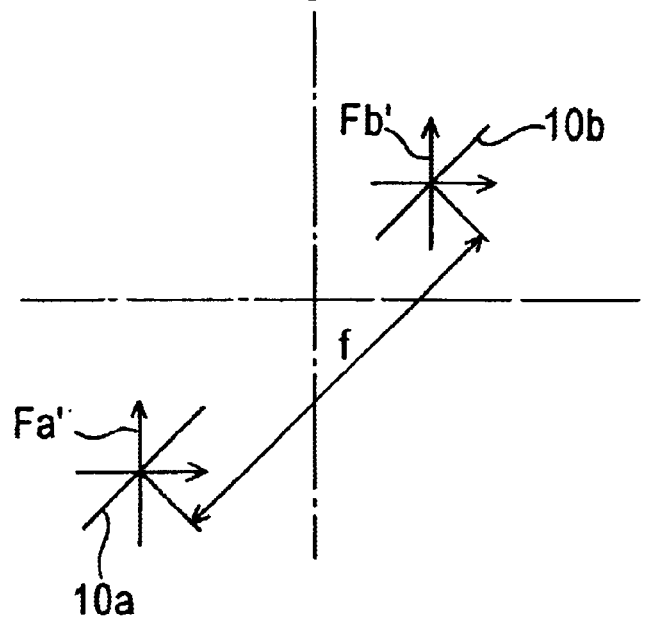
FIG. 14 illustrates the image forming position.

As shown in FIGS. 10~12, separator lens 9, aperture mask 8, and photoreceptor sensor 10 have a basic disposition inclined an angle $\theta1$ matching the angle $\theta1$ of the AF area, and only the separator lens 9 is rotated only an angle $\theta2$ so as to correct the positions of the lens elements 9a' and 9b'. In this way the image forming positions Fa' and Fb' of the object overlay the two photoreceptors 10a and 10b of the photoreceptor sensor 10 as shown in FIG. 14, and the photoreceptors 10a and 10b view the same image.

Figure 21:
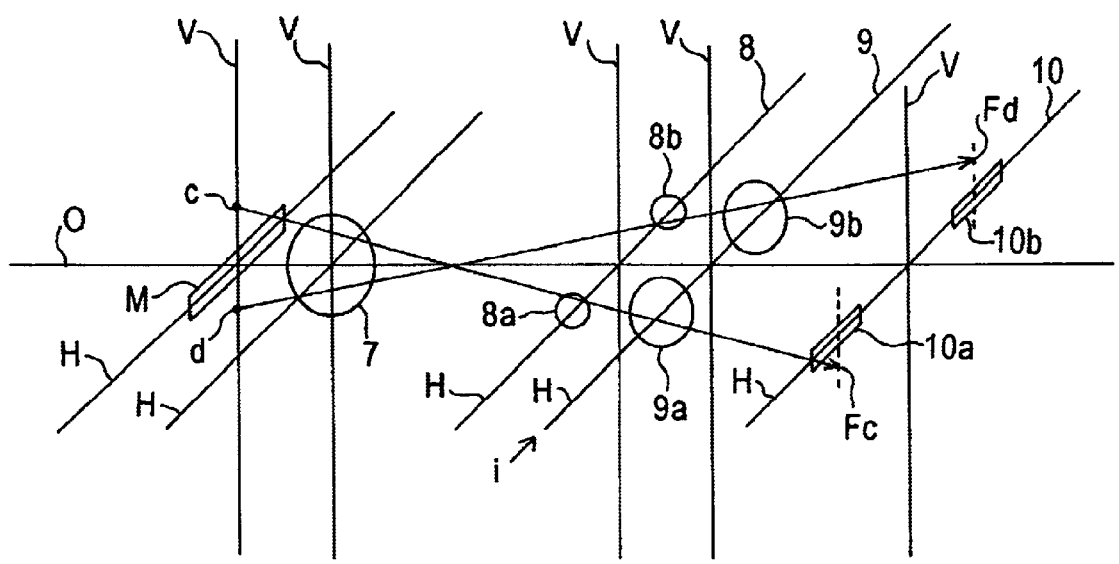
FIG. 21 is a perspective view of the focus detecting device.

FIG. 21 is a perspective view showing the arrangement of the AF area M, condenser lens 7, apertures 8a and 8b of the aperture mask 8, lens elements 9a and 9b of the separator lens 9, and photoreceptors 10a and 10b of the photoreceptor sensor 10 on a plane including the optical axis O and a first axis H intersecting the optical axis O. In the drawing, reference symbol V refers to a second axis perpendicular to a plane including the optical axis O and a first axis H intersecting the optical axis O. Positions c and d, which are shifted from the AF area M on the focal plane 6 in the direction of the second axis V, form images at positions Fc and Fd shifted relative to the photoreceptors 10a and 10b.

Figure 20A:
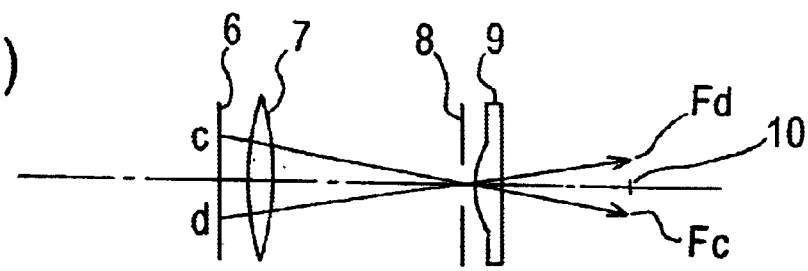
FIGS. 20a–g are views from the i direction of FIG. 21.

FIG. 20(a) is a view from the i direction along the first axis H of FIG. 21. Conventionally, the standard unit (e.g., 10a) of the photoreceptor sensor 10 cannot view the same image as the reference unit (e.g., 10b), as shown in FIG. 20(a).

Figure 20B:
Figure 20C:
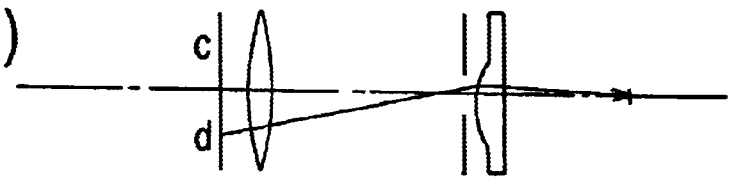

In the first embodiment, the same image is viewed with the decentered separator lens 9, as shown in FIGS. 20(b) and 20(c). Although the image is unfocused on the photoreceptor sensor 10 at this time, focus detection concerns the correlation of the outputs of photoreceptors 10a and 10b, such that a decrease in detection accuracy is not a problem.

According to the first embodiment, since aberration of luminous flux is corrected by adjusting the centripetal position of the separator lens, the photoreceptor sensor suitably receives the luminous flux of the focus detection area, and decrease of the focus detection accuracy is prevented.

A second embodiment is described below.

Figure 15:
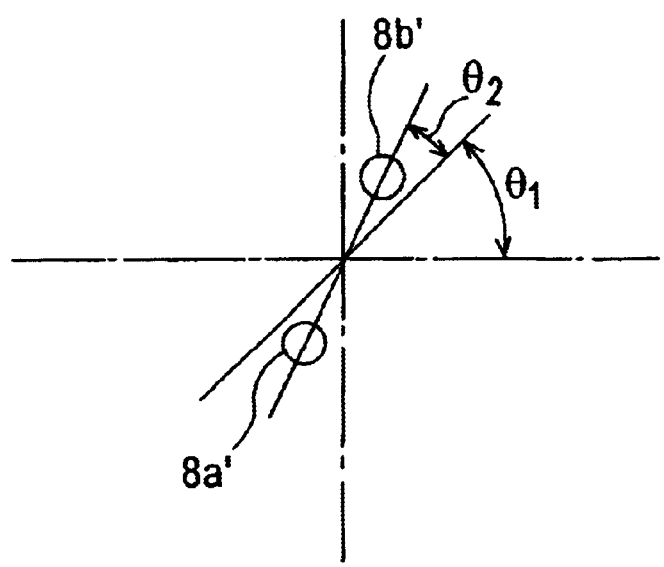
FIG. 15 is a layout diagram of the separator lens in a second embodiment of the present invention.

Separator lens 9, aperture mask 8, and photoreceptor sensor 10 have a basic disposition inclined an angle 21 matching the angle 21 of the AF area, and only the aperture mask 8 is rotated only an angle 23 so as to correct the positions of the apertures 8a' and 8b', as shown in FIG. 15. In this way the two photoreceptors 10a and 10b of the photoreceptor sensor 10 view the same image similar to the first embodiment.

Figure 20D:
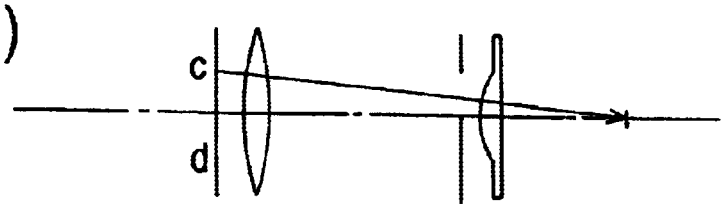
Figure 20E:
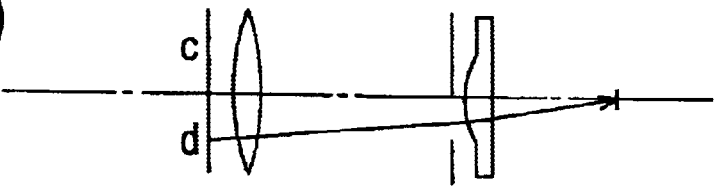

The same image is viewed with the decentered aperture mask 8, as shown in FIGS. 20(d) and 20(e).

According to the second embodiment, decrease of focus detection accuracy is prevented because only the luminous flux of the focus detection area attains the photoreceptor sensor for receiving the luminous flux of the focus detection area and other luminous flux does not attain the photoreceptor sensor.

A third embodiment is described below.

Figure 16:
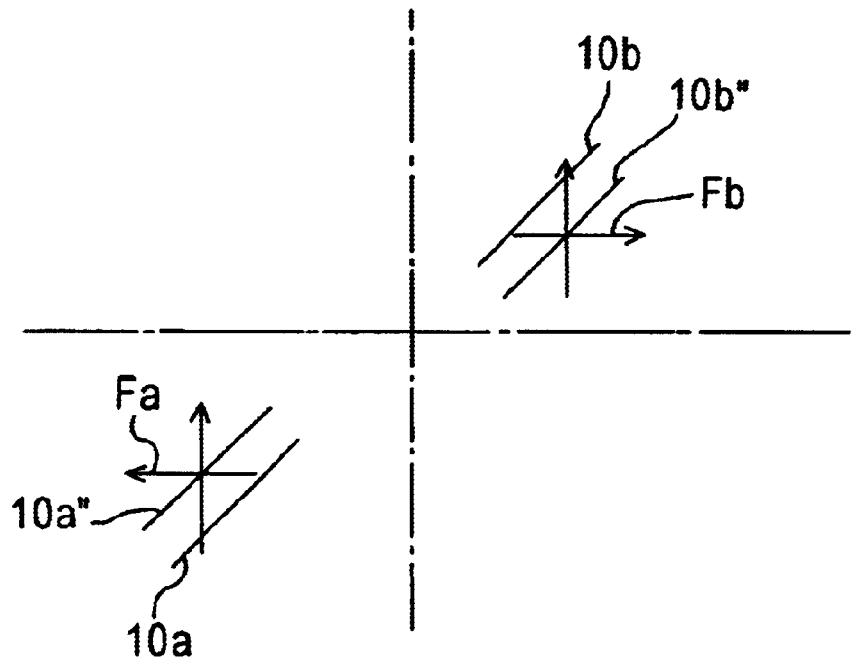
FIG. 16 is a layout diagram of the photoreceptor sensor in a third embodiment of the present invention.

Separator lens 9, aperture mask 8, and photoreceptor sensor 10 have a basic disposition inclined an angle 21 matching the angle 21 of the AF area, and the photoreceptors 10a" of the photoreceptor sensor 10 are shifted from the line direction in a perpendicular direction as shown in FIG. 16. That is, the photoreceptors 10a" and 10b" are disposed as position which overlay the image forming positions Fa and Fb of the AF area M.

Figure 20F:
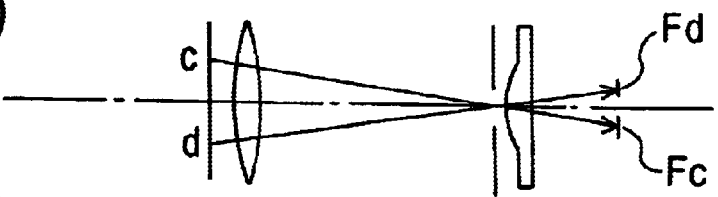

In the third embodiment, the photoreceptors 10a" and 10b" of the photoreceptor sensor 10 are shifted so as to view the same image as shown in FIG. 20(f).

According to the third embodiment, decrease of focus detection accuracy is prevented because the photoreceptor sensor is arranged at a position so as to receive only the luminous flux of the focus detection area and not receive other luminous flux.

A fourth embodiment is described below.

Figure 17:
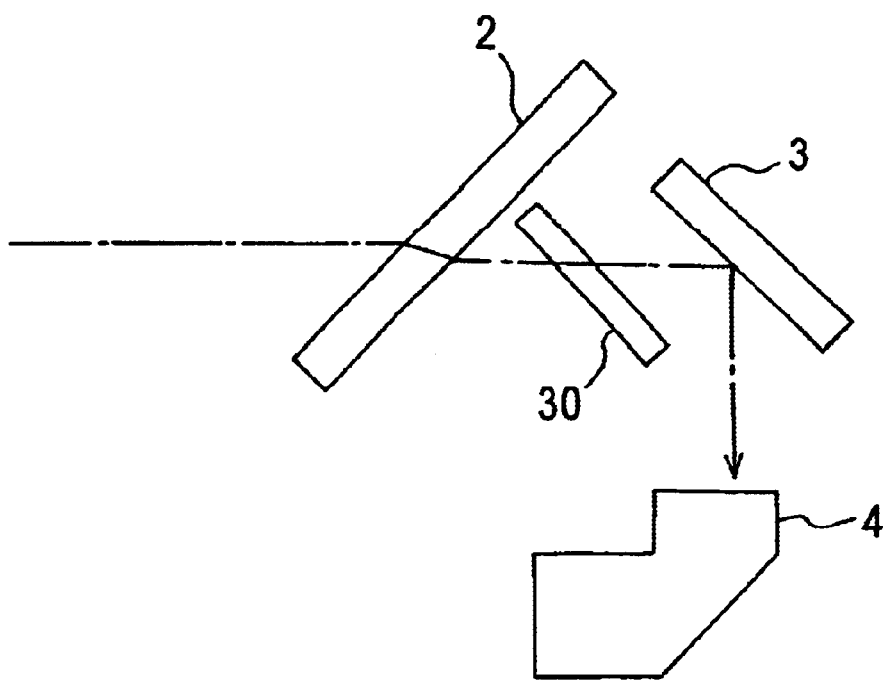
FIG. 17 shows the structure of a fourth embodiment of the present invention.

A correction element 30 is disposed at a suitable position within the optical path behind the main mirror 2 between the main mirror 2 and the photoreceptor sensor 10 (as shown in FIG. 17), or at a suitable position in front of the main mirror 2. The correction element 30 is a transparent flat panel (e.g., a glass plate or the like), and has a suitable refractive index, shape (thickness), and disposition angle so as to nullify the aberration caused by refraction in the main mirror 2.

Figure 20G:
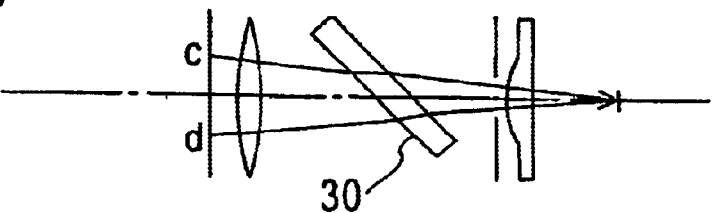

The image forming position is corrected by the correction element 30, as shown in FIG. 20(g).

Figure 22:
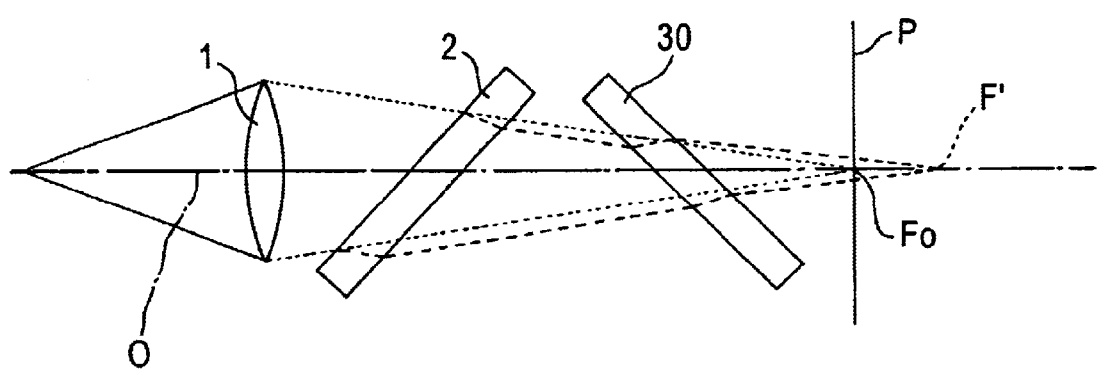
FIG. 22 illustrates aberration correction.

A representative example is shown in FIG. 22, wherein the correction element 30 is formed of the same material and having the same thickness as the main mirror 2, and is disposed at equal angle in mutually opposite direction relative to the optical axis of the main mirror 2. The image forming position Fo on the focal plane P is shifted to position F' by the correction element 30, and although the image is unfocused on the photoreceptor sensor 10 at this time, focus detection concerns the correlation of the outputs of photoreceptors 10a and 10b, such that a decrease in detection accuracy is not a problem.

According to fourth embodiment, the luminous flux transmitted through the main mirror 2 impinges the first surface of the correction element 30, reflected by the second surface, and thereafter emitted. The luminous flux is refracted at this time because the correction element 30 is disposed at an inclination to optical axis. That is, the aberration generated as the luminous flux is transmitted through the main mirror 2 is corrected by the refraction within the correction element 30, thereby preventing a decrease in the focus detection accuracy.

A fifth embodiment is described below.

Figure 18:
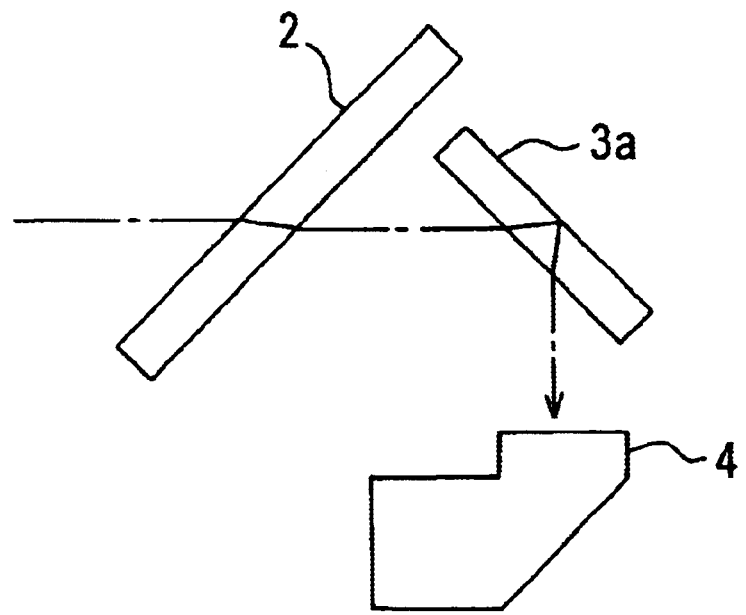
FIG. 18 shows the structure of a fifth embodiment of the present invention.

As shown in FIG. 18, the back surface of a sub-mirror 3a disposed behind the main mirror 2 reflects luminous flux to the AF module 4, and nullifies the aberration caused by refraction via the main mirror 2. The sub-mirror 3a has suitable refractive index, and shape (thickness).

A sixth embodiment is described below.

Figure 19:
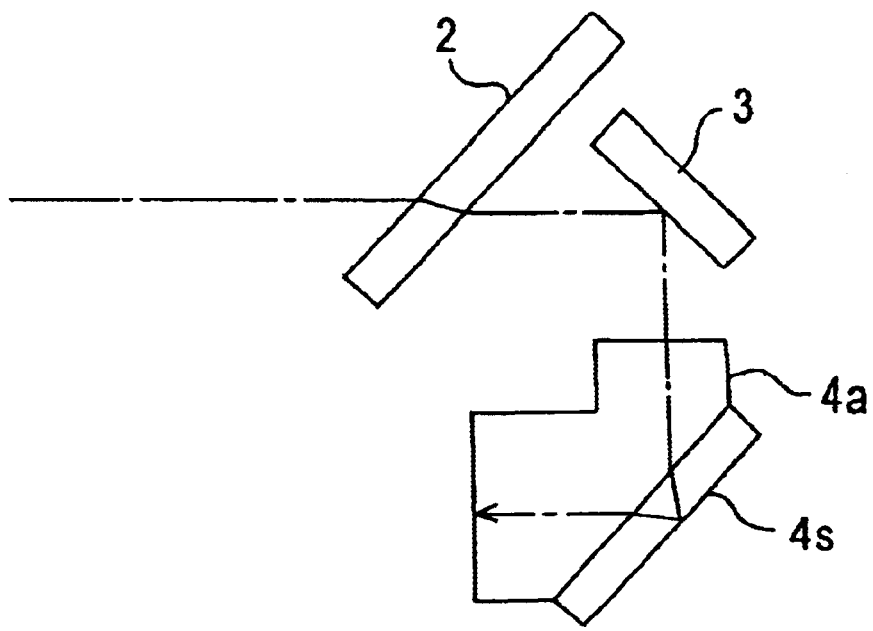
FIG. 19 shows the structure of a sixth embodiment of the present invention.

As shown in FIG. 19, the reflective back surface of a reflective mirror 4s provided within the AF module 4a nullifies the aberration generated by the main mirror 2. The reflective mirror 4s has a suitable refractive index and shape (thickness).

In the seventh embodiment, the main mirror 2a is a prism which corrects aberration.

Figure 23:
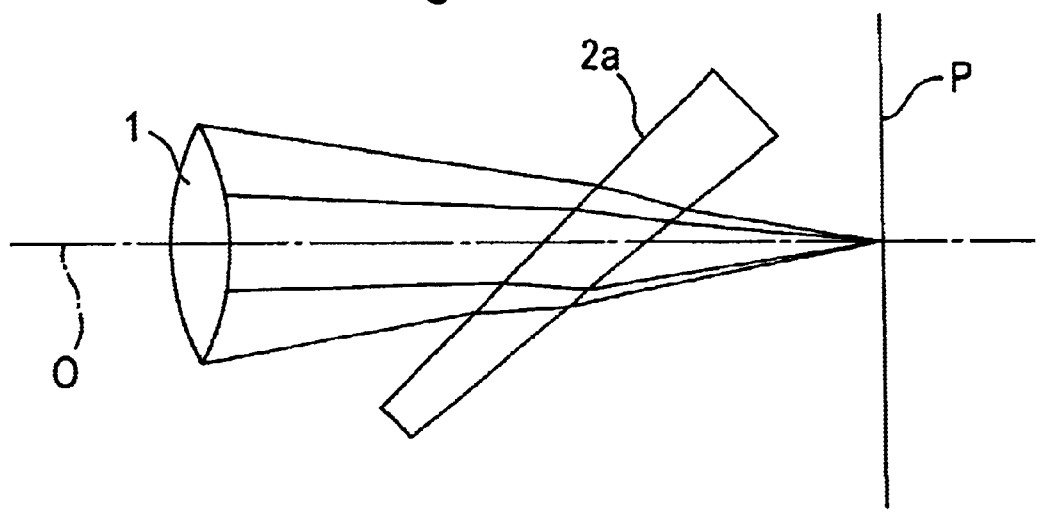
FIG. 23 shows the structure of a seventh embodiment of the present invention.

The main mirror 2a has an entrance surface and exist surface which are non-parallel as shown in FIG. 23, and are shaped such that the luminous flux transmitted through the main mirror 2a forms an image at the center of the optical axis on the focal plane P. The separator lens 9, aperture mask 8, and photoreceptor sensor 10 have a basic disposition at an angle $\theta 1$ matching the angle $\theta 1$ of the AF area.

An eighth embodiment changes the thickness of a main mirror 2b to correct distortion.

Figure 24:
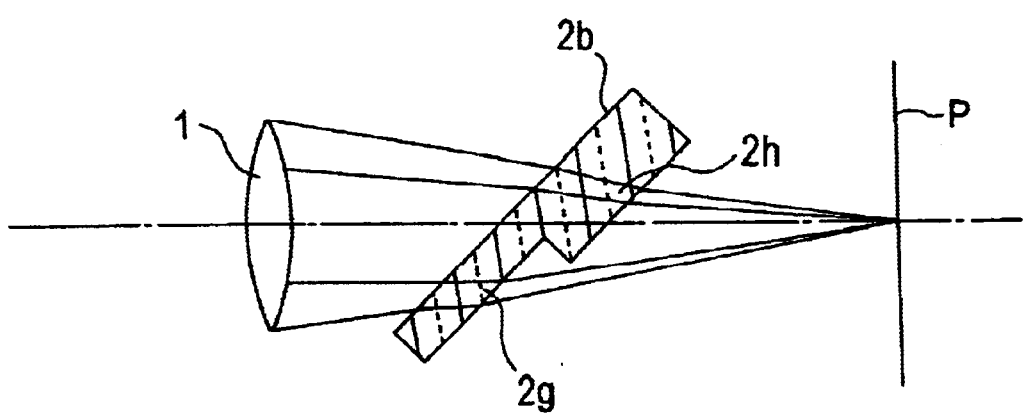
FIG. 24 shows the structure of a eighth embodiment of the present invention.

The main mirror 2b has areas 2g and 2h of different thickness through which is transmitted the luminous flux that forms images near the two photoreceptors 10a and 10b of the photoreceptor sensor 10, as shown in FIG. 24. In this way there is no aberration generated in the luminous flux transmitted through the areas 2g and 2h.

A ninth embodiment changes the refractive index of a main mirror 2c to correct aberration.

Figure 25:
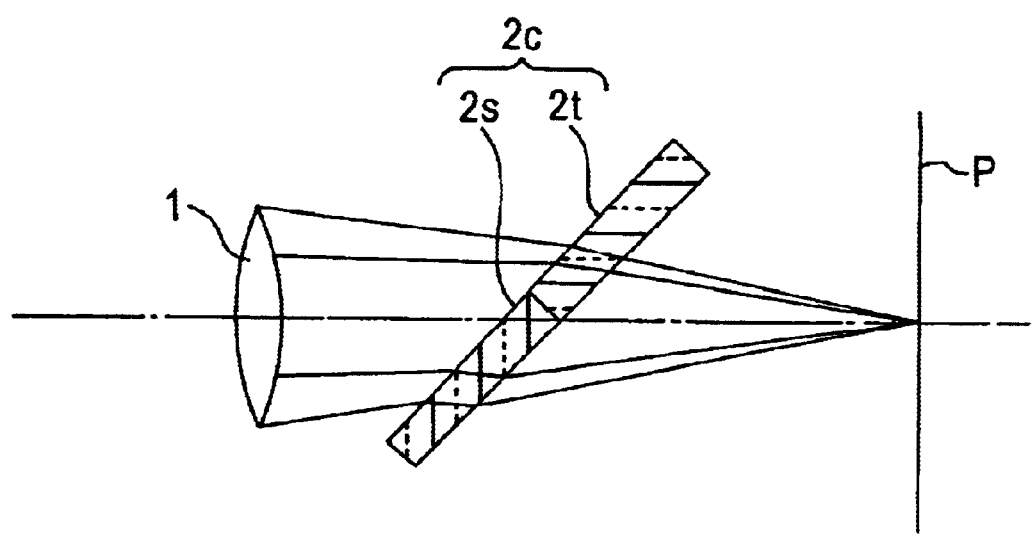
FIG. 25 shows the structure of a ninth embodiment of the present invention.

The main mirror 2c is constructed of materials having different refractive indices at areas 2s and 2t through which is transmitted the luminous flux that forms images near the two photoreceptors 10a and 10b of the photoreceptor sensor 10, as shown in FIG. 25. In this way there is no aberration generated in the luminous flux transmitted through the areas 2s and 2t.

According to each of the aforesaid embodiments the AF area is disposed at an inclination, and because aberration generated by a main mirror is corrected, there is no decrease in focus detection accuracy.

The present invention is not limited to the above-described embodiments, and may be various modified.

For example, if the lens elements 9a and 9b of the separator lens 9 are formed as separate components rather than being integratedly formed as a single component, the aberration of the main mirror 2 can be corrected by simply moving the lens elements in vertical directions.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A focus detecting device for detecting the focus of a taking lens using the luminous flux of a focus detection area disposed at an inclination relative to the photographic field, comprising:

a first optical element for transmitting luminous flux transmitted through the taking lens and disposed at an inclination relative to an optical axis behind the taking lens; and a second optical element arranged at a position for correcting aberration generated by luminous flux transmitted through the first optical element and disposed behind the first optical element.

2. The focus detecting device according to claim 1, wherein said second optical element is a separator lens, and said separator lens is arranged at a centripetal position for correcting aberration generated by luminous flux transmitted through the first optical element.

3. The focus detecting device according to claim 1, wherein said second optical element is an aperture mask for capturing only luminous flux of the focus detection area.

4. The focus detecting device according to claim 1, wherein said second optical element is a photoreceptor sensor.

5. A focus detecting device for detecting the focus of a taking lens using the luminous flux of a focus detection area disposed at an inclination relative to the photographic field, comprising:

a first optical element for transmitting luminous flux transmitted through the taking lens and disposed at an inclination relative to an optical axis behind the taking lens; and a second optical element disposed at an inclination relative to the optical axis and disposed behind the first optical element, wherein the second optical element is provided with a first surface through which enters the luminous flux transmitted through the first optical element, and a second surface for reflecting the luminous flux transmitted through the first surface.

6. The focus detecting device according to claim 5, wherein said first optical element is a main mirror, and the second optical element is a sub-mirror disposed in adjacent to the main mirror.

7. The focus detecting device according to claim 5, wherein second optical element is a reflecting mirror disposed within a focus detection module.

8. A focus detecting device for detecting the focus of a taking lens using the luminous flux of a focus detection area disposed at an inclination relative to the photographic field, comprising:

a first optical element for transmitting luminous flux transmitted through the taking lens and disposed at an inclination relative to an optical axis behind the taking lens; and a second optical element for transmitting light transmitted through the first optical element and disposed at an inclination in the opposite direction of the first optical element.

9. The focus detecting device according to claim 8, wherein the first optical element and the second optical element are formed of identical material, and are disposed at equal angles in mutually opposite directions relative to the optical axis.

10. The focus detecting device according to claim 8, wherein the first optical element and the second optical element have identical thickness, and are disposed at equal angles in mutually opposite directions relative to the optical axis.

* * * * *